United States Patent [19]

Tournois

[11] Patent Number: 4,458,342
[45] Date of Patent: Jul. 3, 1984

[54] DIVERSIFIED TRANSMISSION MULTICHANNEL DETECTION SYSTEM

[75] Inventor: Pierre Tournois, Paris, France

[73] Assignee: Thomson-CSF, Paris, France

[21] Appl. No.: 316,913

[22] Filed: Oct. 30, 1981

[30] Foreign Application Priority Data

Nov. 4, 1980 [FR] France ................. 80 23519

[51] Int. Cl.³ .................. G01S 7/54; G01S 15/06
[52] U.S. Cl. ....................... 367/88; 367/100; 367/101; 343/16 R
[58] Field of Search ............... 367/88, 7, 11, 100, 367/101, 102; 343/16 R

[56] References Cited

U.S. PATENT DOCUMENTS

| | | | |
|---|---|---|---|
| 3,381,264 | 4/1968 | Lavergne et al. | 367/88 |
| 3,427,617 | 2/1969 | Richman | 367/100 |
| 3,680,100 | 7/1972 | Woerrlein | 343/16 R |
| 3,956,749 | 5/1976 | Magorian | 343/16 R |

Primary Examiner—Richard A. Farley
Attorney, Agent, or Firm—Cushman, Darby and Cushman

[57] ABSTRACT

A detection system for imaging by sonar or radar signals. The system associates diversified transmissions with an interferometric base. This base provides an angular channel formation means and each signal formed in this way is processed by matched filtering in a circuit containing copy signals characterizing the space coloring obtained by the diversified transmission means. The invention is particularly applicable to side or front looking detection sonars.

19 Claims, 16 Drawing Figures

FIG.1

SIGNAL APPLIED ON ONE RADIATING ELEMENT

SIGNALS ON m×n CARRIERS

SIGNALS WITH m×n CODES

FIG.4

SIGNALS OF SAME CODE ON DIFFERENTS CARRIERS

FIG.5

SIGNALS OF p×q CODES ON $\frac{m \times n}{p \times q}$ CARRIERS

FIG. 16

DIVERSIFIED TRANSMISSION MULTICHANNEL DETECTION SYSTEM

BACKGROUND OF THE INVENTION

The present invention relates to detection systems by echoes of the radar or sonar type in which an angular sector is the source of electromagnet or ultrasonic radiation transmissions. The determination of the content of the sector follows from the detection and detailed analysis of the signals reflected by the points of the space which were irradiated or insonified. This analysis supplies information on the angular position and distance of the targets. On the basis of this information, it is possible to form on the screen of a cathode ray tube an image representing the scanned sector. The distance of a target from the transmission - reception system is a function of the time elapsing between the transmission of a pulse and the reception of the echo corresponding thereto. The angular position of the target may depend on the directivity of the transmission and/or reception means. The invention more particularly relates to echo detection systems in which reception involves the use of two receivers, whilst the waves are simultaneously received by a system of radiating elements.

Such an association of transmission and reception means has already been proposed in U.S. Patent No. 3,716,824 granted on Feb. 13, 1976. This U.S. Pat. describes a sonar apparatus in which two receivers form a reception channel, whose directivity involves a fan-like lobe arrangement. A line of transmitters supplied by a pulse-modulated monochromatic carrier supplies a very selective insonification of the sector to be monitored, which only covers one of the reception lobes. In this procedure, monitoring is essentially of a punctiform nature and much less extensive than the angular sector in which the reception means can detect the echoes. This system can only supply a detailed image of the sea bed by an appropriate mechanical scanning because only a single channel is used on transimission and reception.

BRIEF SUMMARY OF THE INVENTION

The present invention aims at obviating these disadvantages by offering the possibility of providing monodimensional front or side looking sonars, as well as bidimensional front looking sonars. These extensive field sonars make it possible to display objects on the sea bed. Without passing beyond the scope of the invention, reference is also made to medical imaging equipment and non-destructive testing equipment. In order to achieve this result with only two transducers as the reception means, a diversified transmission is adopted consisting of applying differentiated excitations to the transmission transducers. Such a transmission is said to be coloured, because it assigns to each direction of the monitoring sector an illumination law inherent thereto and which characterizes each echo as a function of its source. The thus personalized echo can be perceived in a univocal manner by a system of reception channels. Moreover, knowing a priori the diversified composition of the echo producing radiation, it is possible to carry out in the reception channels processing by correlation providing a greater resolution in connection with the processing of the angular data.

The present invention more specifically relates to a diversified transmission multichannel detection system comprising transmission means using a system of adjacent radiating elements positioned at the apex of a predetermined angular sector and reception means using a pair of receivers centered on said apex for detecting echoes from said sector, wherein the transmission means comprise means for the simultaneous pulse excitation of the radiating elements assigning to each of them a signal shape or form permitting its identification as an element of the system, the reception means comprise a plurality of reception channels connected to the receivers by channel forming means associating with each of the receiving channels a surface with a constant step difference belonging to the said angular sector, each of the receiving channels being connected to a filter matched to the particular configuration of the echoes coming from the surface with a constant step difference.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
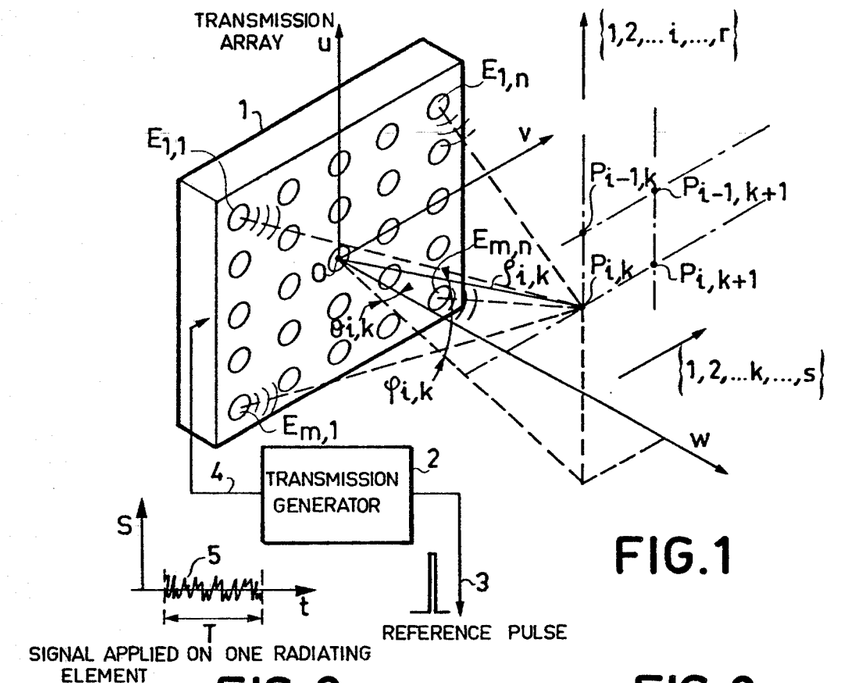
FIG. 1 a system of radiating elements making it possible to perform a diversified transmission.
Figure 2:
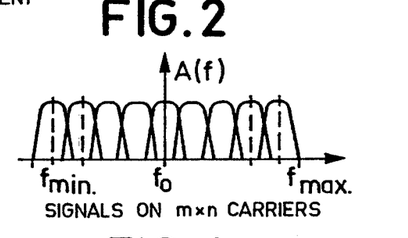
FIGS. 2, 3, 4 and 5 various band structures of signals which can be used in a diversified transmission.

FIG. 1 shows an electromagnet or ultrasonic wave transmission system 1 making it possible to effect a detection by echoes of the radar or sonar type within the scope of a diversified transmission. The radio space or the marine propagation medium are related to a system of axes u, v, w, whose origin 0 located at the centre of system 1 also represents the apex of an angular monitoring sector. The transmission system 1 comprising, for example, a matrix arrangement of radiating elements $E_{1,1} \ldots E_{1,n} \ldots E_{m,1} \ldots E_{m,n}$ which, in the case of a sonar, are electromechanical mechanical transducers able to sound the monitoring sector in a uniform manner. Each radiating element of system 1 is excited by a transmission generator 2 supplying a brief pulse used as a reference to an output 3. A system of connections 4 supplies to each of the radiating elements of system 1 pulse signals 5, whose path is shown in FIG. 1 to the left of generator 2. The duration of excitation signals 5 is T and their shape S(t) is chosen so as to be able to identify each radiating element by the content which it transmits. For a number m×n of radiating elements, it is possible, for example, to assign a separate transmission frequency to each radiating element in the manner shown in FIG. 2. If the frequency band of the transmission covers a range B limited by the frequencies $f_{min}$ and $f_{max}$, it is clear that this procedure involves using $m \times n$ signals of band b with $b = B/(m \times n) = 1/T$. Thus, $m \times n$ carrier frequencies $f_{1,1}, f_{1,2} \ldots f_{m,n}$ are used separated from one another by the value b. Frequency-shifted band pass filters are used for identifying these signals.

Figure 3:
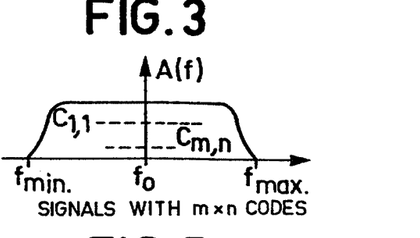

According to a different procedure, it is possible to use a single carrier $f_o$ and distinguish the signals by modulation using $m \times n$ orthogonal codes, each occupying band B. This procedure is illustrated in FIG. 3 in which $C_{1,1} \ldots C_{m,n}$ represent identifiable orthogonal functions of duration T.

Figure 4:
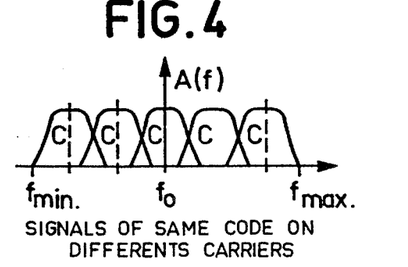
Figure 5:
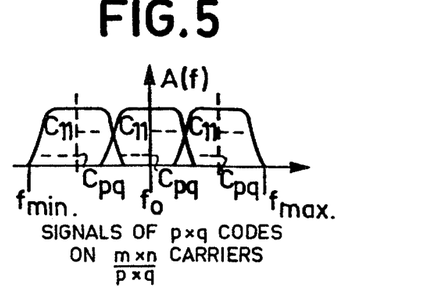

As is shown in FIG. 4, it is possible to use as other coding modes a code C of duration T which modulates several carrier frequencies displaced by a value b' exceeding 1/T. It is also possible to provide W carrier frequencies modulated by $p \times q$ codes $C_{1,1} \ldots C_{p,q}$ of duration T with $(m \times n)/(p \times q) = W$ in the manner shown in FIG. 5.

Whatever the coding mode used for exciting the radiating elements of system 1, it can be seen that the sounded space is "coloured". Thus, FIG. 1 shows a dividing into squares of the space by r lines parallel to v and by s lines parallel to u. One of the points $P_{i,k}$ of the system of $r \times s$ intersections collects a transmission composed by $m \times n$ discernable values. The polar coordinates $\theta_{i,k}, \phi_{i,k}, \rho_{i,k}$ of the point $P_{i,k}$ determine with the coordinates of the radiating elements $E_{m,n}$ a particular type of irradiation which it is possible to calculate.

In order to fix the ideas, on assuming that the radiating elements of FIG. 1 are reduced to a single row of M elements $E_1, E_2 \ldots E_j, \ldots E_M$ and by designating a point in the coloured space as $P_i$, it is possible to represent the irradiation received in $P_i$ by the formula:

$$S(P_i) = \sum_{j=1}^{M} C_j(t - \tau_{ij})$$

in which $C_j(t)$ is the coded excitation applied to the radiating element $E_j$ and $\tau_{ij}$ is the propagation time along a line joining $E_j$ and $P_i$. This simplified formula takes no account of the attenuation as a function of the distance.

In general terms, the radiating elements can be positioned in a random manner, provided that they appropriately sample the space and that it is possible to use identifiable codes for predicting and recognising without ambiguity the combinations represented by this colouring of the space.

The transmission diversity described hereinbefore with reference to FIGS. 1 to 5 plays a vital part in the detection of the echoes. Thus, a target receiving the coloured transmission reflects a coloured echo which can be separated from the other echoes by a correlation based on the knowledge a priori of the composition of the echo. At each point, $P_{i,k}$ of the space a signal $S(P_{i,k})$ is received, which is formed by the sum in amplitude and phase of the codes transmitted by the transmitter $E_{1,1}, \ldots E_{m,n}$. These codes are received at point $P_{i,k}$ with a combination of delays dependent on the geometrical positions of the transmitters and of point $P_{i,k}$. For other points such a $P_{i,k+1}, P_{i-1,k}, P_{i-1,k+1} \ldots$ the combinations of the delays differ and therefore the signals S assigned to these other points also differ. Thus, the signal $S(P_{i,k})$ is dependent on the codes C transmitted, the spatial coordinates of the point in space forming the source of an echo and the spatial coordinates of the radiating elements of transmission system 1. If the points $P_{i,k}$ are far enough away from the transmission system, the signals $S(P_{i,k})$ are dependent only on the coordinates $\theta_{i,k}$ and $\phi_{i,k}$.

Figure 6:
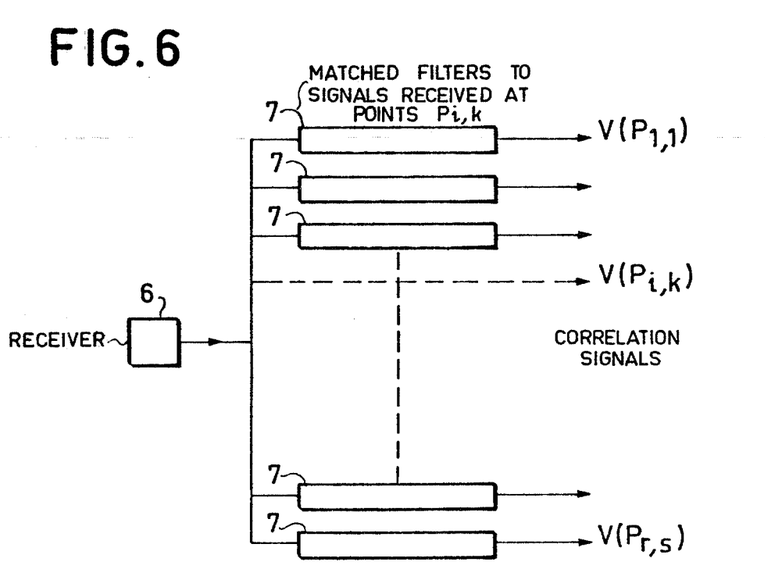
FIG. 6 the diagram of a directivity-free reception making it possible to obtain a selection in association with the transmitter system of FIG. 1.
Figure 7:
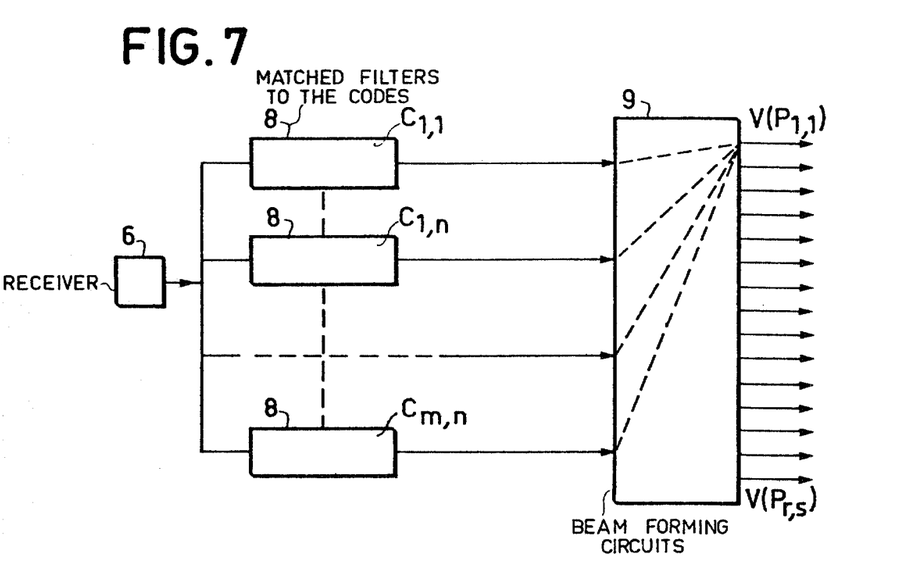
FIG. 7 a variant of the diagram of FIG. 6.

FIG. 6 shows how, at reception, it is possible to process a coloured transmission, whilst wave receiver 6 has no inherent directivity. The echo signals are received by receiver 6, which supplies a complex electrical signal at the input of a system of angular channels. Each angular channel is allocated to an echo source direction, which in FIG. 1 is the straight line passing through 0 and through $P_{i,k}$. For example, receiver 6 can be located at point 0 and the receiver system of FIG. 6 may comprise $r \times s$ angular channels. Each angular channel is constituted by a filter 7 matched to the signals $S(P_{i,k})$ from which emerges a correlation peak $V(P_{i,k})$. The matched filter 7 of the angular channel $(\theta_{i,k}, \phi_{i,k}, \rho_{i,k})$ is designed to react to the theoretical combination $S(P_{i,k})$ of the transmissions produced in $P_{i,k}$ by the transmitter system. Thus, diversified transmission leads to the a priori definition of a coloured space giving the system of FIG. 6 reception properties provided with an angular selectivity. FIG. 7 illustrates a constructional variant of a receiver system having the same angular selectivity. Filters 8 matched to code C are supplied by the single receiver 6, which receives the echoes from the coloured space. The filters 8 matched to each of the transmitted codes used for exciting the radiating elements of the transmission system 1 separate each of the codes of the system of codes $C_{1,1}, C_{1,2}, \ldots C_{1,n} \ldots C_{mn}$. The correlation peaks supplied by the matched filters 8 are then processed by an angular channel formation circuit 9 having $m \times n$ inputs connected to $r \times s$ outputs. Dotted lines represent the group within circuit 9 for compensating delays $\tau_{ij}$ of the codes used for forming the channel $V(P_{1,1})$. This channel is served by signals from the $m \times n$ filters 8 added to the time lags which, added to the delays with which the elementary transmission arrive at point $P_{1,1}$, give a constant total delay or time lag. The receiver system of FIG. 7 is equivalent to that of FIG. 6 but better illustrates the "imaging" function of circuit 9 which, although located in the reception section of an echo system, provides a separating power and an energy contrast based on the geometry of the transmission means. To this end, forming circuit 9 is a so-called "transmission channel formation circuit on reception".

Before defining a system according to the invention which is based on the use of a diversified transmission and on a detector system using two receivers $R_1$ and $R_2$, it is of interest to demonstrate the ambiguity of a system having two receivers using a non-diversified transmission produced by a single non-directional transmitter E.

Figure 8:
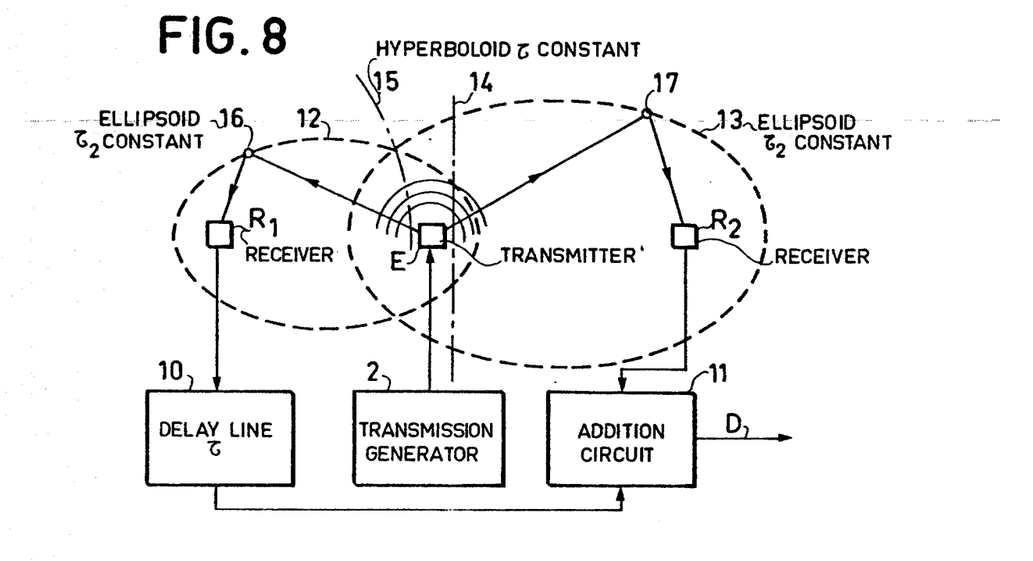
FIG. 8 a detection system using an interferometric base with a non-diversified transmission.

The diagram of such a system is illustrated by FIG. 8. The single transmitter E is excited by a generator 2 which, for example, emits pulses of duration T and carrier frequency $f_o$. The receiver system comprises two receivers $R_1$ and $R_2$ positioned on either side of transmitter E. A delay line 10 producing a delay $\tau$ and connected to a summating circuit 11 forms an angular channel able to select echoes from a hyperbolic surface 15, which is a geometrical locus of step difference $\tau$ for receptions effected by the two receivers $R_1$ and $R_2$. Signal D leaving summating circuit 11 is associated with any echo from layer 5, but in the absence of a colouring of the space by diversified transmission signal D can be the source of serious confusion in locating the echoes. In order to illustrate this ambiguity it is merely necessary to consider two echoes coming from separate targets 16 and 17. Receiver $R_1$ receives the echo from target 16 with a delay $\tau_1$ after the transmission of a pulse by transmitter E. This delay $\tau_1$ defines a geometrical locus in the form of an ellipsoid of revolution 12 with sources $R_1$ and E. In the same way, receiver $R_2$ receives the echo from target 17 with a delay $\tau_2$ after the transmission of the same pulse by transmitter E. This delay $\tau_2$ defines another geometrical locus in the form of an ellipsoid of revolution 13 having the sources $R_2$ and E. If $\tau_2 - \tau_1 = \tau$, the signal D due to the reflections on the two targets will be formed in the same way as if it resulted from a single echo coming from one point of the hyperbolic surface 15. This explanation shows that the device of FIG. 8 is unsuitable for unambiguously locating echoes.

In order to obviate this disadvantage the invention proposes effecting univocal location by using the diversified transmission method.

Figure 9:
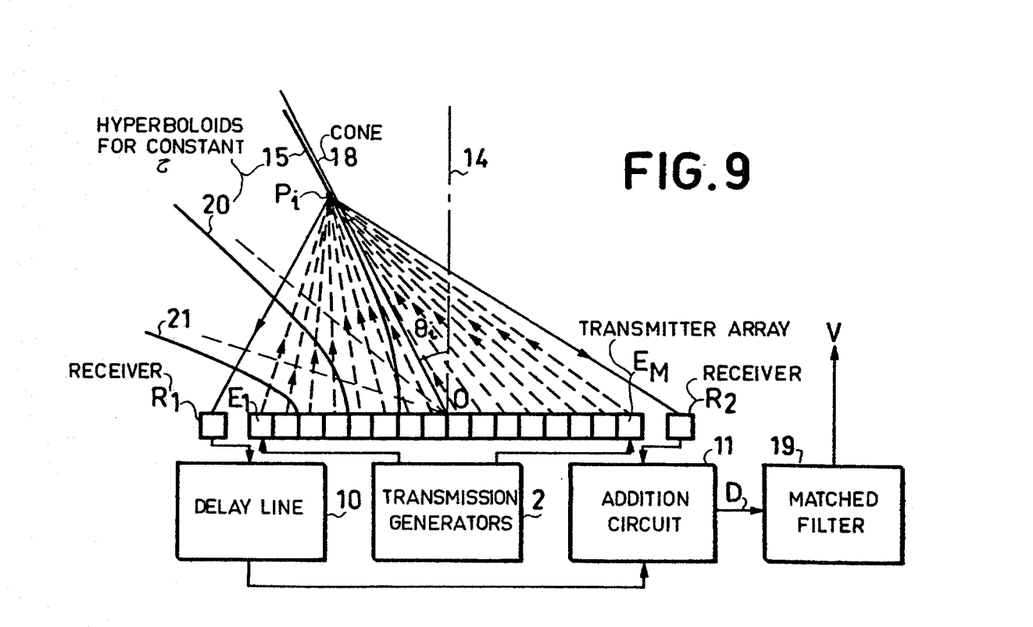
FIG. 9 a detection system according to the invention.

In FIG. 9, it is possible to see that the transmission is obtained from the system of radiating elements $E_1 \ldots E_m$ forming, for example, a line. In addition, the angular channel formed is provided with a matched filter 19. Generator 2 supplies M separable excitations producing at point $P_i$ a composite insonification characterizing this point. It is possible to calculate this insonification taking account of the codes used and the dotted line paths towards point $P_i$. When this insonification has been calculated, it makes it possible to perform a matched filtering in filter 19 in such a way that the signal of channel V obtained cannot correspond to other points of the coloured space. Thus, the system is no longer subject to the detection ambiguity referred to in connection with FIG. 8.

The two receivers $R_1$, $R_2$ make it possible to subdivide the space into several hyperbolic surfaces 15, 20, 21 corresponding to constant step differences. It is therefore possible to form several angular channels by associating with each layer a delay line 10, whose delay $\tau$ corresponds to the step difference $P_i R_2 - P_i R_1$. When point $P_i$ is far enough away from the transmitter line, each hyperbolic surface, whose path 15 can coincide with the path 18 of the asymptotic cone, whose axis is the line joining receivers $R_1$ and $R_2$. This cone is characterized by the angle $\theta_i$ which it forms with the plane 14 constituting the plane of symmetry of the two receivers $R_1$, $R_2$. If transmission takes place by a series of radiating elements positioned along the line of the two receivers, it can be accepted that a remote point $P_i$ receives an insonification which is only dependent on the angle $\theta_1$ and the prior choice of transmitted codes. However, at short distance, the insonification can be adapted to each point of the considered hyperbolic surface.

Figure 10:
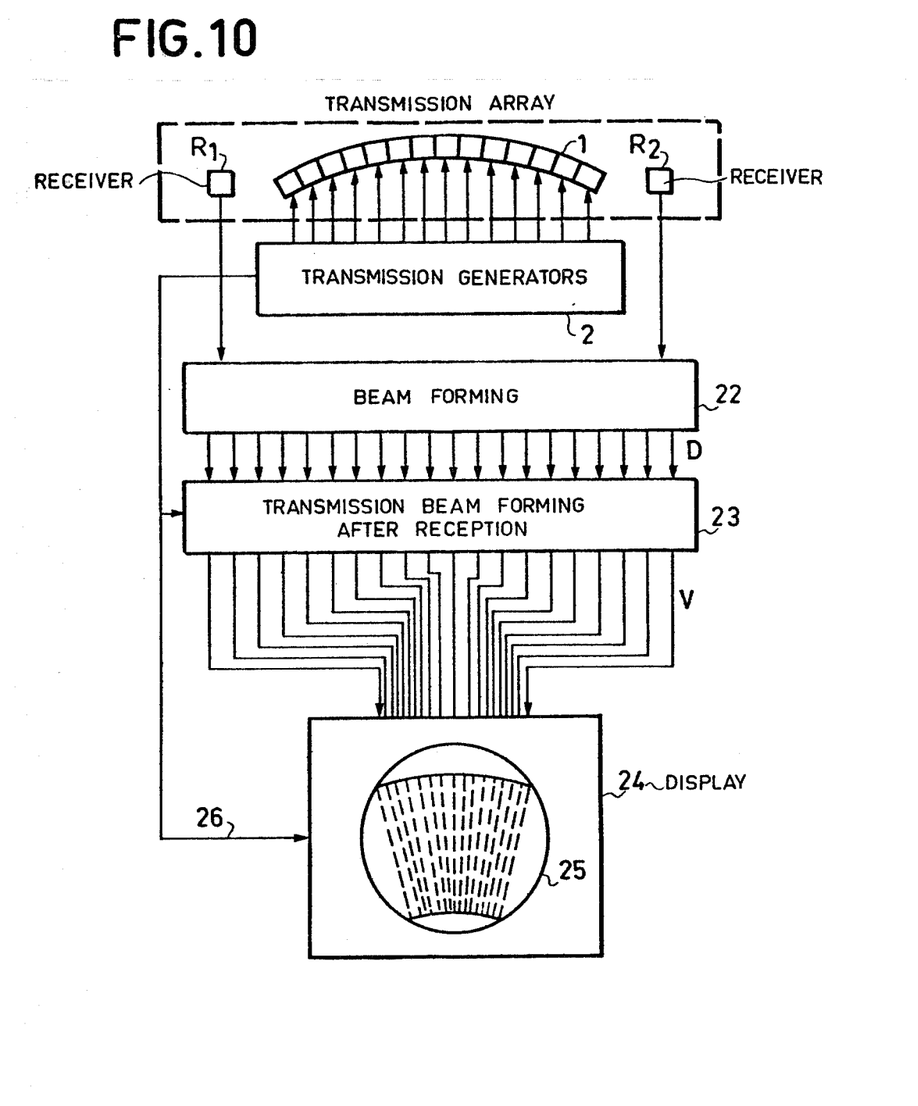
FIG. 10 an overall diagram of the system of FIG. 9.

FIG. 10 gives an overall view of a diversified transmission multichannel protection system. It comprises a system 1 of radiating elements cooperating with two receivers $R_1$ and $R_2$. In a constructional variant, there can be two other receivers $R_3$ and $R_4$. This other line of receivers forming an angle with the line $R_1R_2$ determines a division of the space into squares by the intersections of the two groups of hyperbolic surfaces. It should be noted that each hyperbolic surface such as 15 (FIG. 9) is a surface of revolution whose axis is the line passing through the two receivers. The space is coloured by a generator 2 supplying the radiating elements of system 1 with separating excitation signals, e.g. signals carrying orthogonal codes.

A plurality of reception channels is formed by a circuit 22 comprising several groups realising the summation - delay function of elements 10 and 11 of FIG. 9. Circuit 22 produces the same number of signals D as there are subdivisions in the angular sector to be monitored. Each signal D corresponds to a particular value of the delay $\tau$, i.e. to a particular hyperbolic surface having the property of representing a geometrical locus with a constant step difference.

The signals D of reception beams formed by circuit 22 are applied to a transmission beam formation system 23 on reception constituted by elements like the channel element 19 of FIG. 9. Each matched filtering element transforms each signal D into a correlation peak V when the theoretical shape imposed by the simultaneous, diversified transmission at the echo formation point coincides with the form effectively received by the two receivers. Thus, system 23 comprises a generator of all the copies resulting from the diversified transmission in the monitoring sector. These copies are used in the matched filtering relative to each reception channel.

Consideration will be given to an echo from a point $P_i$ of the monitoring sector. This point $P_i$ belongs to a hyperbolic surface corresponding to a delay $\tau_i$. The signal of channel $D_i$ is obtained by the synchronous addition of two signals received by the two receivers $R_1$ and $R_2$ and its amplitude is 2 if the amplitude of a single signal is taken as equal to 1. For another signal of channel $D_k$, there is another delay $\tau_k$ which differs from $\tau_i$ in such a way that the two signals are added together in quadratic manner to obtain am amplitude of $\sqrt{2}$. The difference between the optimum signal $D_i$ and the other signals of the channel is close to 3dB. In system 23, the filter matched to signal $S(P_i)$ and the only signal if $P_i$ is far enough away, is the filter which processes the signal of channel $D_i$. This processing is equivalent to the synchronous addition of the M signals of the M transmitters from point $P_i$ and forming the signal $S(P_i)$ in such a way that an amplitude increase equal to M is obtained.

This same processing summates in a quadratic manner the M signals coming from another point $P_k$ forming a signal $S(P_k)$ in such a way that the increase obtained is equal to $\sqrt{M}$ is amplitude. Thus the final amplitude contrast on signal $V_i$ compared with another signal $V_k$ is equal to $\sqrt{2M}$, M being the number of transmitters.

FIG. 10 shows a device 24 for processing signals V supplied by circuit 23. This device comprises a screen 25 on which are displayed the echoes received in the monitoring sector. A connection 26 is a pulse indicating the start of transmission to circuit 23 and to processing device 24. This pulse initiates the supply of copies to the different matched filters of system 23. It also serves as a reference for transcribing the outward and return time into a distance measurement. The image formed on the screen 25 can be sectorial in order to represent the angles and distances of the targets. However, for a given distance, it can also be frontal, when it represents the polar coordinates $\theta, \phi$ of FIG. 1.

Figure 11:
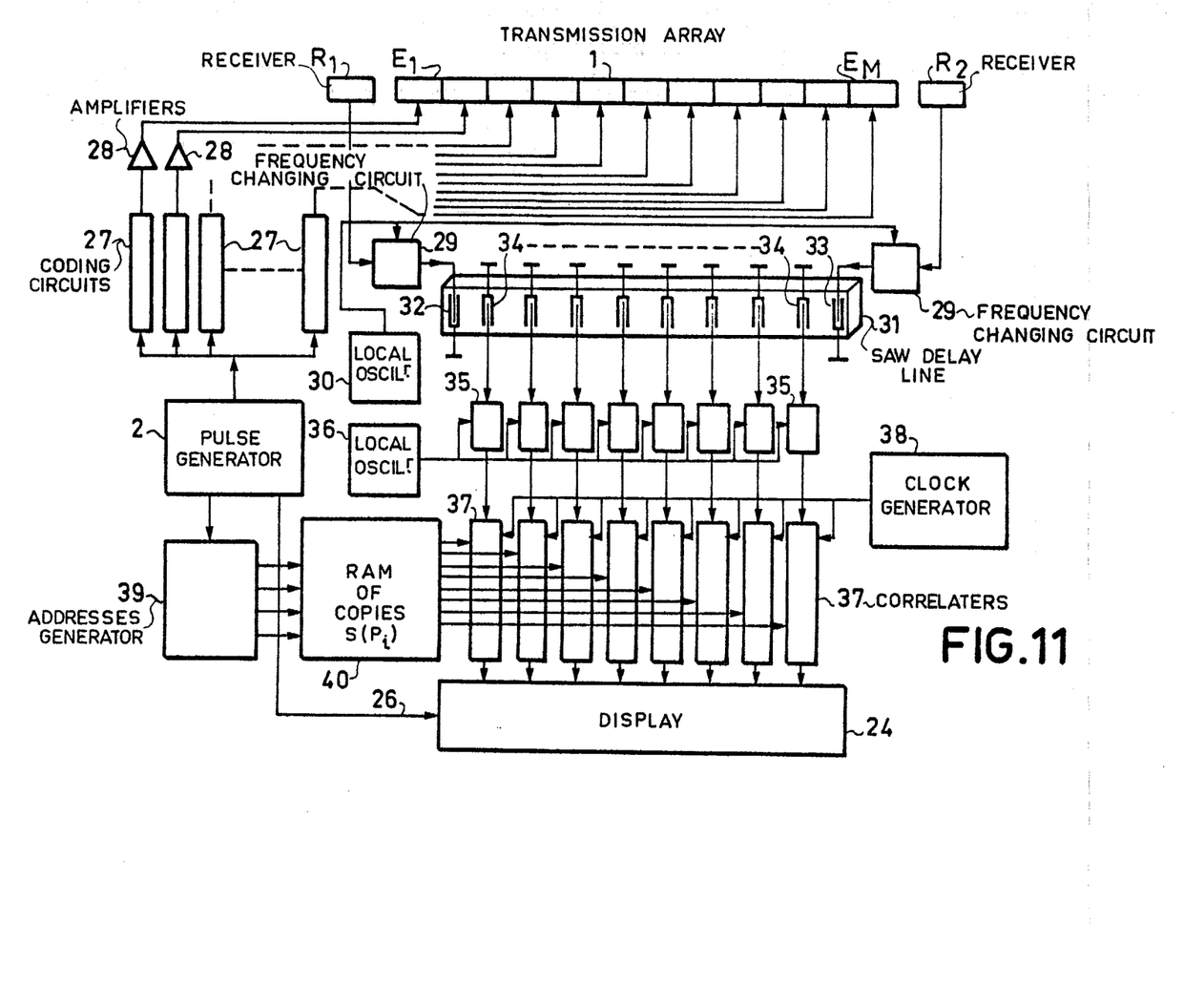
FIG. 11 a first variant of the system of FIG. 10.

As a non-limitative embodiment, it is possible to see in FIG. 11 a detection system according to the invention which is more particularly applicable to side looking sonars. The transmission system 1 comprises a line of radiating elements $E_1 \ldots E_M$ at the ends of which are located two receivers $R_1$ and $R_2$.

The transmission circuits make it possible to excite each radiating element by means of a separable code modulating, for example, a single carrier comprising a brief pulse generator 2, which supplies a system of coding circuits 27, whose pulse responses are the sought codes. Each coding circuit 27 excites a radiating element via a power amplifier 28. The chosen codes are, of the P.S.K. type, i.e. Phase Shifting Keyed. In the case of coding by pure frequencies, circuits 2, 27 and 28 are replaced by a frequency generator of the synthesizer type.

According to an advantageous feature of the invention, the formation of the reception channels is ensured by an elastic surface wave device.

This device comprises a substance 31 made from piezoelectric material carrying two sets of electrodes 32 and 33 in the form of interdigital transducers. These electrode sets are located at the two ends of substrate 31 and form electromechanical transducers transmitting counter-progressive acoustic waves. The signal supplied by receivers $R_1$ and $R_2$ are amplified by amplifiers which are not shown in FIG. 11. The amplified signals are applied to frequency changing circuits 29 with a local oscillator signal supplied by generator 30. This frequency change places the signals received in the operating band of transducers 32 and 33. Transducer 32 transmits to the right a surface wave having the characteristics of the signal received by receiver $R_1$. Transducer 33 transmits to the left a surface wave having the signal characteristics received by receiver $R_2$. A system of intermediate transducers 34 detects and summates with the different time lags, the surface waves from transducers 32 and 33. Thus, transducers 34 directly constitute the output members of the angular reception channels. By placing a transducer 34 at the centre of the distance separating transducers 32 and 33, it is possible to define an average transmission delay corresponding to a zero step difference. This position corresponds to echoes coming from the plane of symmetry 14 (FIG. 9). To obtain a reception channel corresponding to a hyperbolic surface such as 15, it is necessary to displace transducer 34 in order to introduce the desired step difference.

The delay line with elastic surface waves and multiple connections provides the double advantage of simplicity and processing speed. It is highly suitable for systems requiring delays or time lags of approximately 10 $\mu$S. This is applicable with side looking sonars and in the field of medical imaging.

Figure 14:
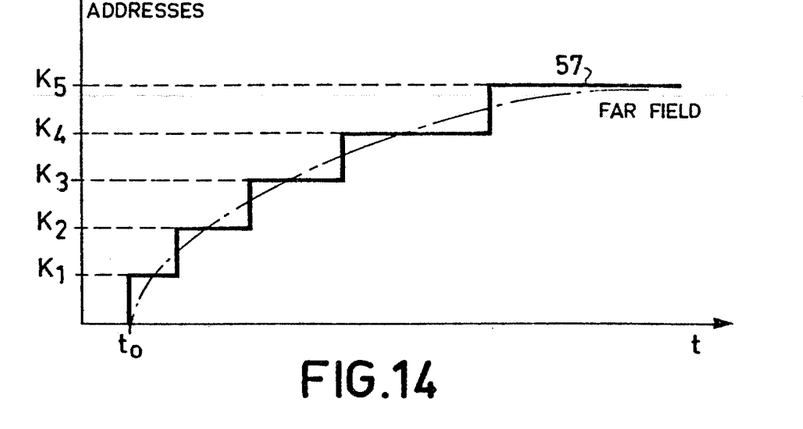
FIGS. 14 and 15 explanatory drawings.

Thus, for a maximum delay of 10 $\mu$S the distance separating transducers 32 and 33 is approximately 7 cm, when using a substrate 31 made from lithium niobate. The reception channels are connected to the frequency changing circuits 35, which receive a local oscillator signal produced by circuit 36. This second frequency change serves to place the spectrum of the channel signals as low as possible in order to make the matched filtering operation simpler. The outputs of the frequency changing circuits 35 are connected to the first inputs of correlation circuits 37. These correlation circuits receive by second inputs copies of the signals $S(P_i)$ supplied by a digital memory 40. A control circuit 39 supplies memory 40 with the addresses of the copies. For each transmitted pulse, generator 2 supplies address generator 9 with a pulse for starting the cycle of correlations. At the start of the cycle, the copy is of a short-range field insonification and then progressively changes to assume the fixed form characterizing the long-range field sounding. This operating mode is illustrated in FIG. 14 showing the addresses of copies $K_1$, $K_2$, $K_3$, $K_4$ and $K_5$ ranging from the short to the long-range field. It can be seen that as from the transmission time $t_o$, the address change evolves increasingly slowly to reach an asymptotic value $K_5$ in FIG. 14. The function of the correlation circuits 37 is to recognise among all the pulse shapes received from the different points of the monitoring sector that characterizing a point $P_i$ located on a hyperbolic surface with a given step difference.

In the envisaged application such as side looking sonars, the pulse times T of the transmitted signals are between a few milliseconds and a few dozen milliseconds.

According to the preferred embodiment of the invention, each correlation circuit 37 is realised in known manner by a correlator with charge-coupled devices (CCD), whose operation is the same as that of a shift register. Each correlator is matched to a signal $S(P_i)$ and at the output a signal having a correlation peak is obtained for signal $S(P_i)$ only.

The signal supplied to the CCD correlators is sampled at frequency $f_{HO}$ supplied by a clock 38. The number of stages K of the correlator is such that $K = T \cdot f_{HO}$. The sampling frequency must be at least twice the frequency of the input signal. The centre frequency $F_c$ of the signal applied to the correlator is made as low as possible, i.e. close to B/2 in order to obtain a minimum number of stages K. According to the invention, the CCD correlators can be programmed and the copy applied evolves as a function of time in the manner shown in FIG. 14. It is pointed out that a programmable CCD convolvers has the structure of a transverse filter and comprises a memory into which is loaded the copy, the actual CCD register, analog multipliers and a summator. To obtain the correlation from a convolver, it is necessary to invert the time variable for one of the two wave shapes.

The system of FIG. 11 is completed by a processing circuit 24 making it possible to obtain an image in the V mode ($\theta$, time).

Without passing beyond the scope of the invention, it is possible to use other technologies both for side looking sonars and other applications.

Thus, FIG. 11 shows a system in which a group of correlating circuits 37 is used. It is also possible to sequentially multiplex in time the signals of the reception channels and carry out matched filtering with a single correlating circuit, which involves replacing parallel processing by series processing.

Figure 12:
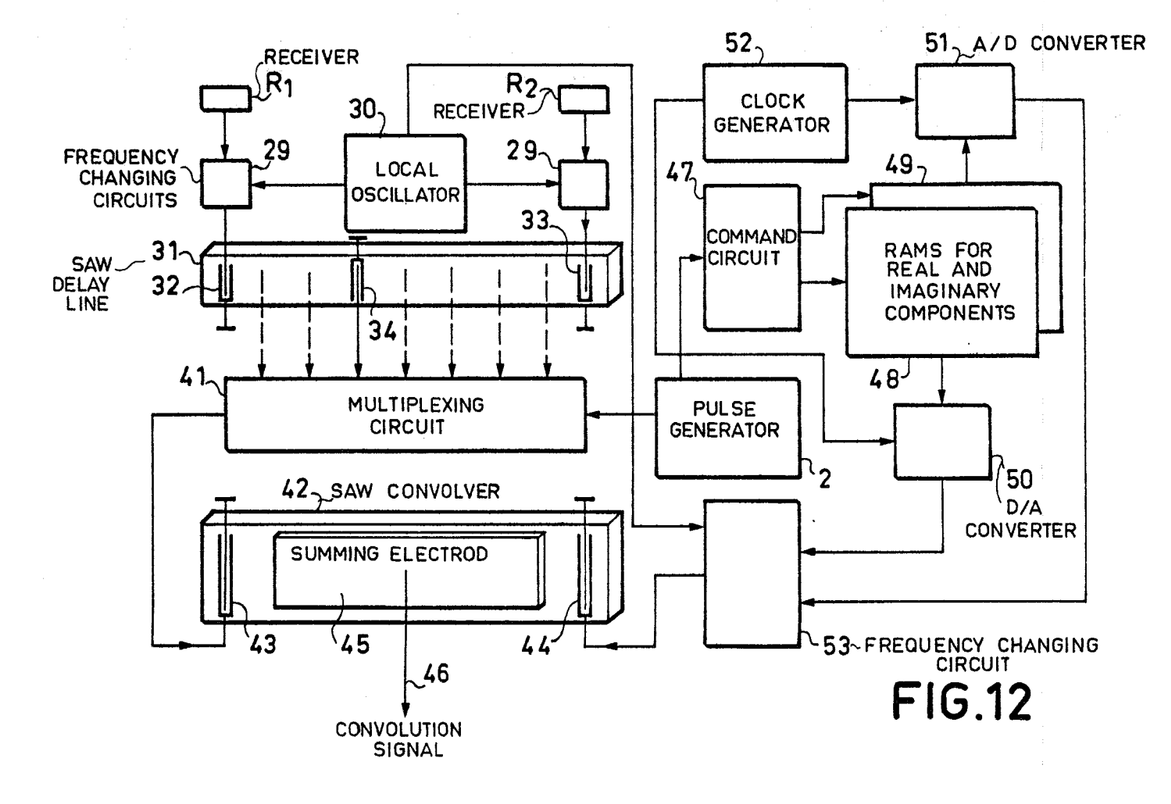
FIG. 12 a second constructional variant of the system of FIG. 10.

Another constructional variant of the invention is illustrated in FIG. 12 and relates to applications such as imaging by echography in the medical field. Thus, it uses elastic surface wave convolving devices of the channel signals implying that the duration T of the pulse supplied to each radiating element is approximately 10 microseconds.

FIG. 12 once again has elements $R_1$, $R_2$, 29, 30 31, 32, 33, 34 and 2 of FIG. 11. The elastic surface wave devices generally operate with a carrier wave of a few dozen megahertz. The signal supplied by transducers 34 are sequentially multiplexed in time by a parallel - series converter 41. The channel signals D therefore arrive in series in time at the input of the convolver and there is a return to the first channel signal at each transmission. FIG. 12 does not show the transmission circuits. The multiplexing timing is chosen so as to take account of the subsequent correlation processing period. Parallel processing with the same number of convolutors as there are channel signals D is also possible.

Correlation processing involves the use of an elastic wave convolver comprising a piezoelectric material substrate 42 having two terminal transducers 43 and 44. These transducers transmit counter-progressive elastic waves which interact in a multiplicative manner. The collecting electrode 45 collects a signal representative of the convolution integral of the electrical signals applied to transducers 43, 44. To obtain the disired correlation function of output terminal 46, there is a time reversal of the copy serving as the comparison element for the signal transmitted by converter 41 and applied to transducer 43. The copies are stored by real and imaginary values in two memory zones 48, 49. The two components of each copy are extracted from memory 48, 49 by a control circuit 47 initiated by a pulse from excitation generator 2. Digital - analog converters 50, 51 under the control of a clock 52 supply sine and cosine multipliers contained in a modulating circuit 53, which receives a local oscillator signal from oscillator 30. The signal supplied by the modulating circuit 53 is applied to transducer 4. The correlation peak available at output 46 has a frequency which is twice as high as the frequency of the input signals. The time necessary for obtaining convolution function is approximately the same as the duration of the input signals.

The embodiments of the system according to the invention described hereinbefore use analog circuits for performing the channel formation and matched filtering.

Figure 13:
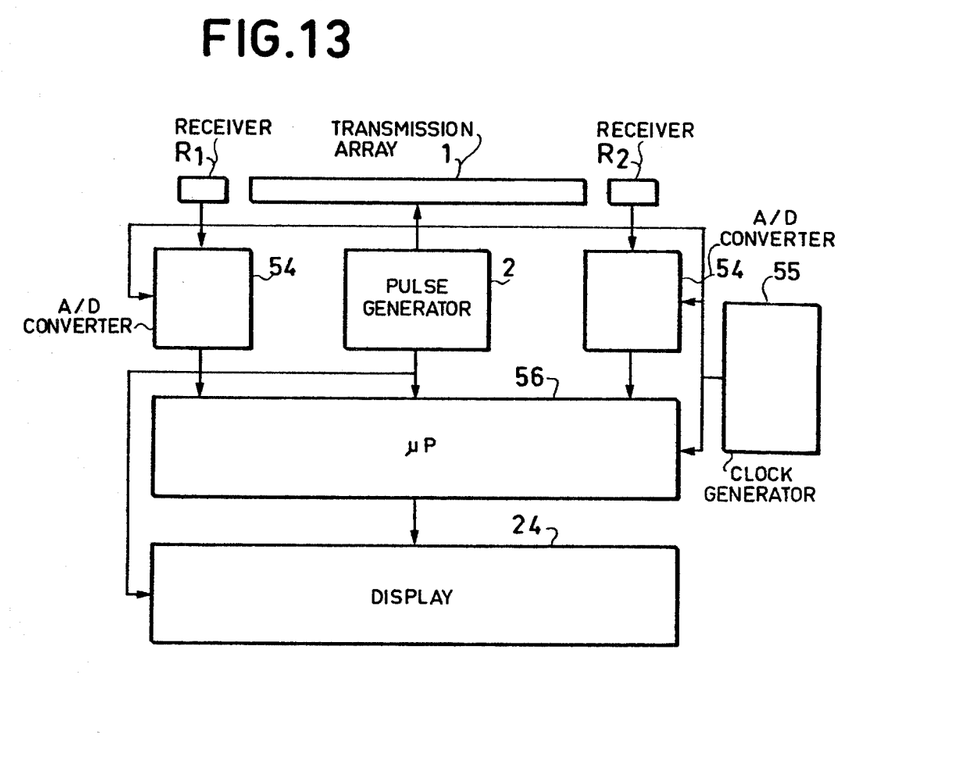
FIG. 13 a third constructional variant of the system of FIG. 10.

FIG. 13 shows a diagram of the system using digital calculation means. The same references designate the same elements as in the preceding drawings. The signals supplied by receivers $R_1$ and $R_2$ are sampled and digitized at frequency $f_{HO}$ of a clock 55 in two analog - digital converters 54. A microprocessor circuit 56 receives the digitized signals from converters 54, as well as an initiation pulse produced by excitation generator 2. The operation of microprocessor circuit 56 is timed by clock 55. In per se known manner, microprocessor circuit 56 comprises R.A.M. and P.R.O.M.-type memories, operators and input - output means. This circuit is programmed for digitally performing the formation of reception channels D and matched filtering. The copies are stored in the memories of the microporcessor circuit and are recalled as the processing cycle proceeds. The processing system 24 receives the output signals of microprocessor circuit 56, which can be directly processed in a memory storing samples representing an image. System 24 may also comprise digital - analog converters permitting the control of a cathode ray tube.

Figure 15:
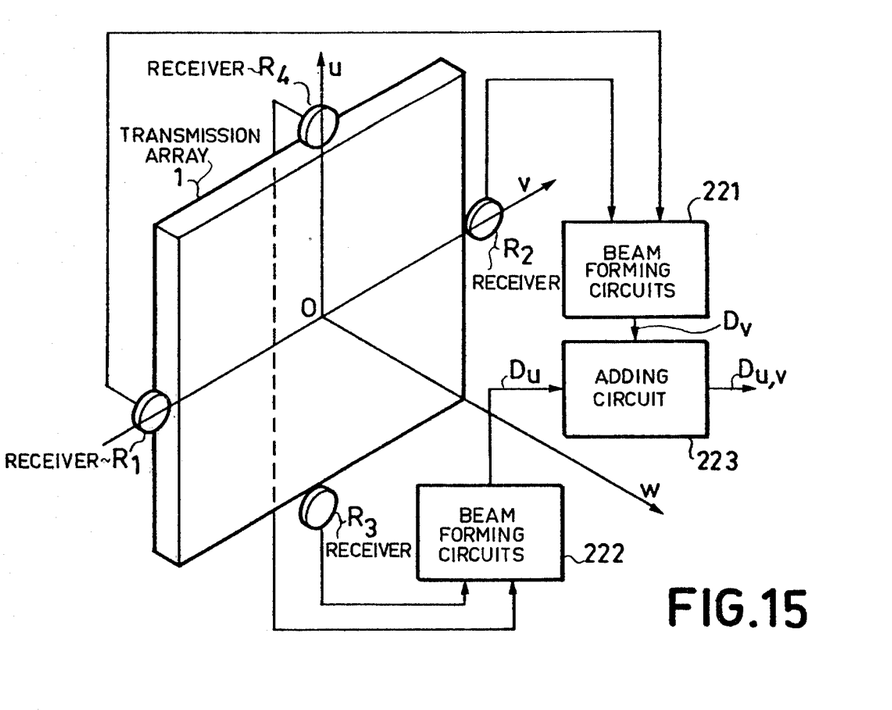

The invention is also applicable to the formation of a bidimensional frontal image of the sector being monitored. In this type of application, the system comprises two interferometric bases. In FIG. 15, it is possible to see a first line oriented in accordance with v and comprising receivers $R_1$ and $R_2$ and a second line oriented according to u comprising receivers $R_3$ and $R_4$. The transmission system 1 may be constituted by a matrix arrangement of radiating elements. However, it may merely constitute one row and one column of radiating elements positioned between the receivers along axes u and v. The beam forming circuits 221, 222 supply signals $D_v$ and $D_u$ which are summated in a forming circuit 223, which supplies signals $D_{u,v}$ which then undergo matched filtering.

Circuits 221, 222 and 223 may be constituted by a single circuit.

Figure 16:
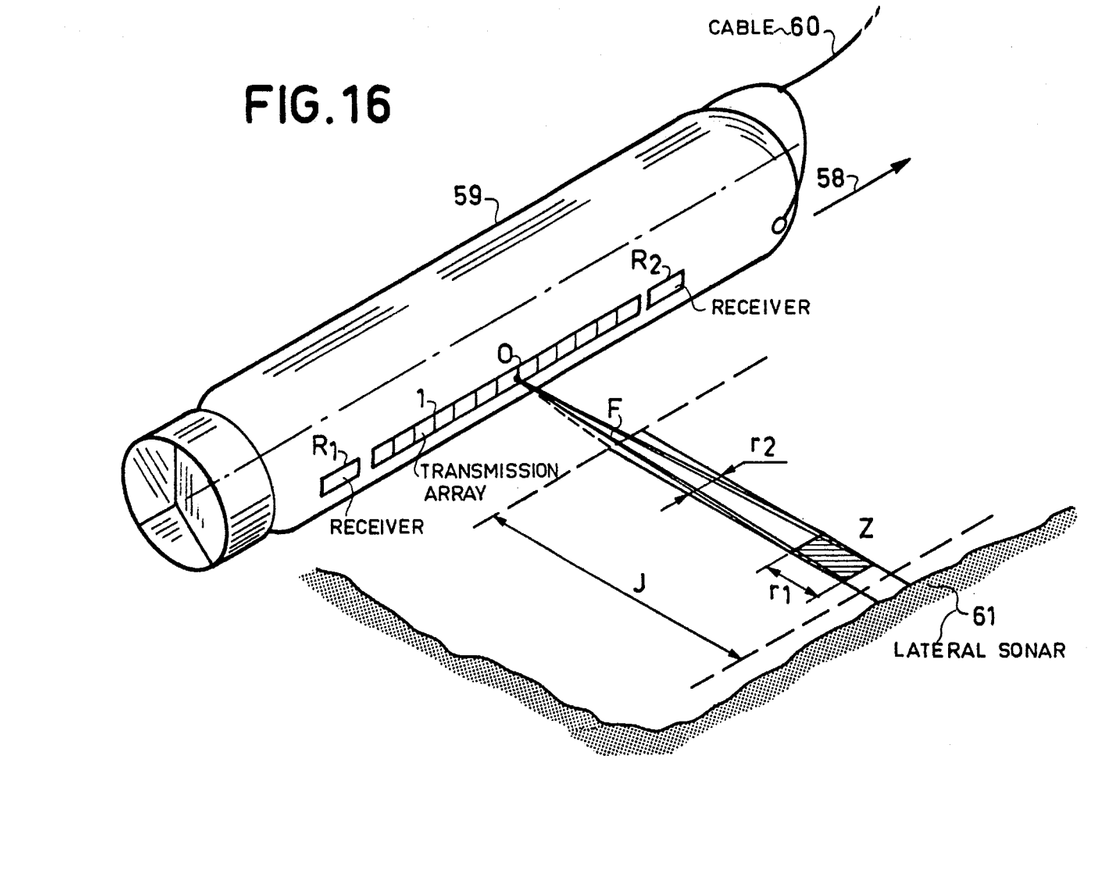
FIG. 16 a side looking sonar.

FIG. 16 shows a typical arrangement of a side looking sonar system. A support vehicle 59 towed by a cable 60 moves in direction 58 in the vicinity of the sea bed 61. A generally linear transmission system 1 and two receivers $R_1$, $R_2$ forming the interferometric base are installed along the side of vehicle 59. Due to the angular channels formed, a beam of directivity F emanates from centre 0 and intercepts the sea bed 61 along lines of width J perpendicular to direction 58.

The hatched area Z corresponds to an angular channel formed and at the projection distance a certain resolution $r_2$ is obtained for a certain angular width of the channel. The transmitted frequency band B determines the distance resolution $r_1$. Bearing in mind the speed of the vehicle, the range and the resolution $r_2$ it is necessary to form a number of angular channels. An image is obtained of the sea bed as a result of the movement of vehicle 59.

The characteristics of a sonar of this type are, for example, as follows:
Range: 200 meters
Resolution: $r_1 = 0.2$ meters; $r_2 =$ meters
Transmission antenna length: 3.5 meters
Support vehicle movement speed: 5 m/s.

Receivers $R_1$ and $R_2$ are at a distance of 2.5 m from one another and the values obtained for the main parameters are as follows:
centre transmission frequency: $f_o = 250$ kHz
frequency band: $B = 7.5$ kHz
distance between consecutive radiating elements: $d = 20$ mm
number of channels formed: 7
angular field: 0.4°
length of radiating elements: $l = 20$ mm
number of radiating elements: $M = 128$
pulse duration: $T = 10$ ms
CCD clock frequency: $f_{HO} = 10$ kHz
number of CCD stages: $K = 100$ per filter.

The coding circuits on transmission generate 128 orthogonal codes with 128 bits. In order to obtain a good rejection of transmission image lobes, the two receivers are advantageously directional. Their length is, for example, approximately 50 mm.

The proposed system greatly simplifies the reception circuits and makes it possible to obtain a given angular resolution with reduced dimensions of the transmission and reception means. Moreover, this system functions in a wide frequency band and makes it possible to obtain in real time even short-range images.

I claim:
1. A diversified transmission multi-channel detection system comprising:
transmission means for emitting signals to illuminate an angular sector of space, said transmission means including
an arrangement of radiating elements positioned at the apex of said angular sector,
means for simultaneously exciting each of said radiating elements with a signal having different characteristic from the signals exciting the other radiating elements thereby enabling its identification upon reception; and
reception means for receiving and processing echos of the signals emitted by said transmission means to characterize the angular sector of space illuminated by said transmission means, said reception means including a pair of receivers centered on said apex for detecting said echos from said sector;

channel forming means, coupled to said receivers, for forming a plurality of reception channels, filter means, coupled to said channel forming means, said filter means being responsive to the combined illumination of said radiating elements of a particular region of said sector, and means coupled to said filter means, for processing signals therefrom and generating information suitable for display characterizing said sector.

2. A system according to claim 1 wherein said filter means comprises a programmable matched filter and means for programming said matched filter in accordance with the characteristics of signals exciting said radiating elements.

3. A system according to claim 2 further comprising means for providing said characteristics for coupling to said exciting means and programmable filter.

4. A system according to claim 3, wherein said providing means comprises a memory for storing said characteristics and an address generator for addressing said memory to read said characteristics therefrom.

5. A system according to claim 1 wherein said channel forming means, filter means, and processing means are formed by programmable computer means including an arithmetic unit, a read only memory (ROM) and a random access memory (RAM) for storing intermediate calculation results of said arithmetic unit.

6. A system according to claim 1, wherein the channel forming means comprise a delay line with an elastic surface wave device.

7. A system according claim 1 or 6, wherein filter means comprises a matched filter associated with each channel.

8. A system according to claim 1 or 6, wherein said filter means comprises a single matched filter and the channels are sequentially multiplexed for series processing by said single matched filter.

9. A system according to claim 8, wherein the matched filter is constituted by a CCD correlator.

10. A system according to claim 9, further comprising means for transposing the frequencies of signals in said channels by frequency changing circuits.

11. A system according to claim 4, wherein the addresses produced by the address generator are a function of transmission time so as to permit the matching of signal characteristics to long-range and short-range echoes in real time.

12. A system according to claim 1, wherein the filter means comprises an elastic wave convolver.

13. A system according to claim 5, wherein the arithmetic unit comprises at least one microprocessor circuit.

14. A system according to claim 1, wherein said reception means comprises two crossed interferometric bases including (4) receiver elements, which are each provided with said pair of receivers, the channel forming means including means for collecting signals supplied by the four receiver elements and each channel is then processed by matched filtering.

15. A system according to claim 1, wherein the transmission means transmits sonar signals.

16. A system according to claim 1, wherein the transmission means transmits radar signals.

17. A diversified transmission multi-channel detection system comprising:

transmission means for emitting signals to illuminate and angular sector of space, said transmission means including an arrangement of radiating elements positioned at the apex of said angular sector, means for simultaneously pulse exciting each of said radiating elements with a signal having different signal shape from the signals exciting the other radiating elements thereby enabling its identification upon reception; and reception means for receiving and processing echos of the signals emitted by said transmission means to characterize the angular sector of space illuminated by said transmission means, said reception means including a signal receiver for detecting said echos from said sector, channel forming means coupled to said receiver, for forming a plurality of reception channels, matched filter means, coupled to said channel forming means, said filter means having filter characteristics to be responsive to the combined illumination of said radiating elements of a particular region of said sector, and means coupled to said matched for processing signals therefrom and generating information suitable for display characterizing said sector.

18. A system according to claim 17, wherein the matched filter is matched to the particular configuration of the echoes from the said sector.

19. A system according to claim 17, wherein the matched filter is matched to the signal shape, a transmission channel formation circuit on reception being supplied by the said filter.

* * * * *